UNITED STATES PATENT OFFICE.

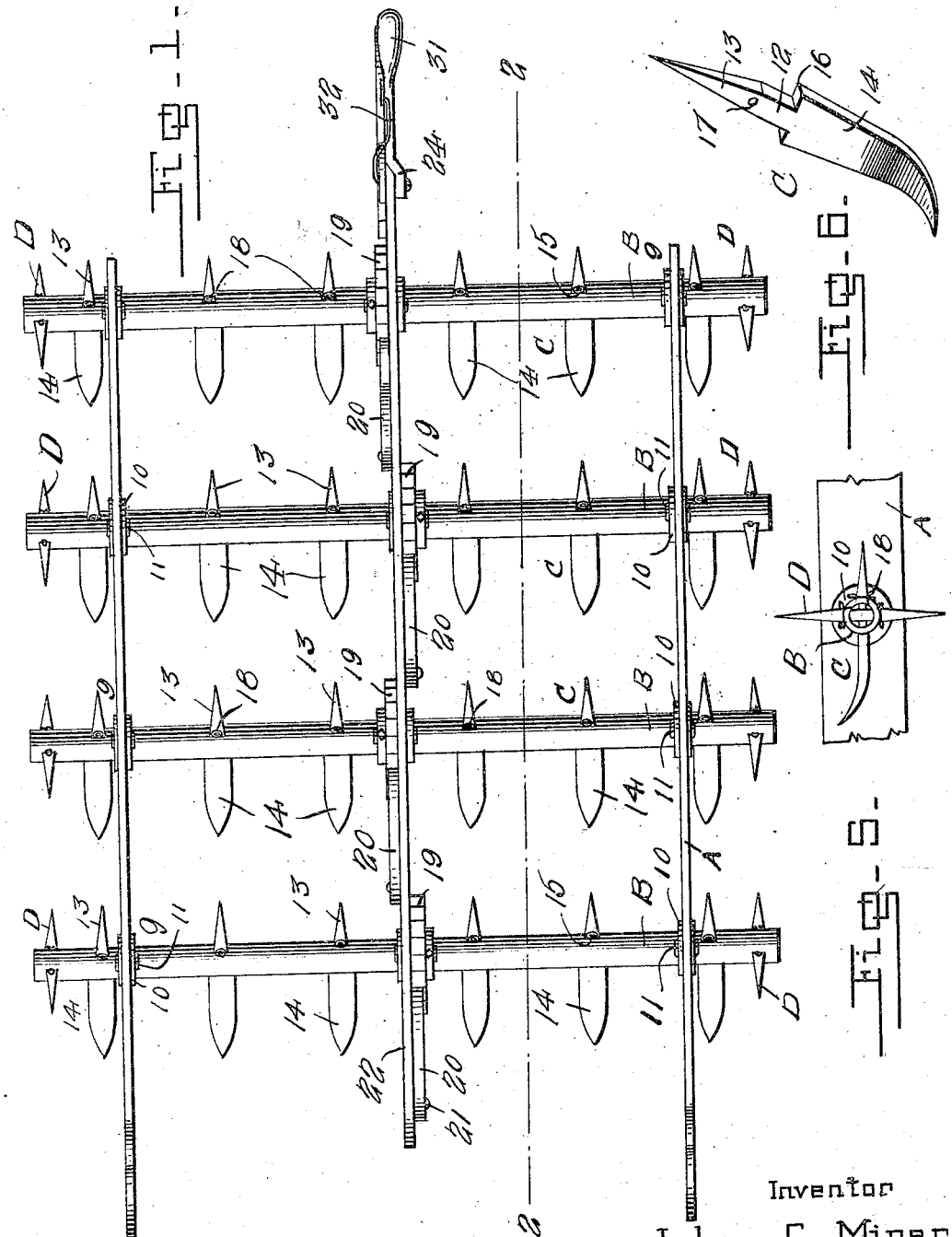

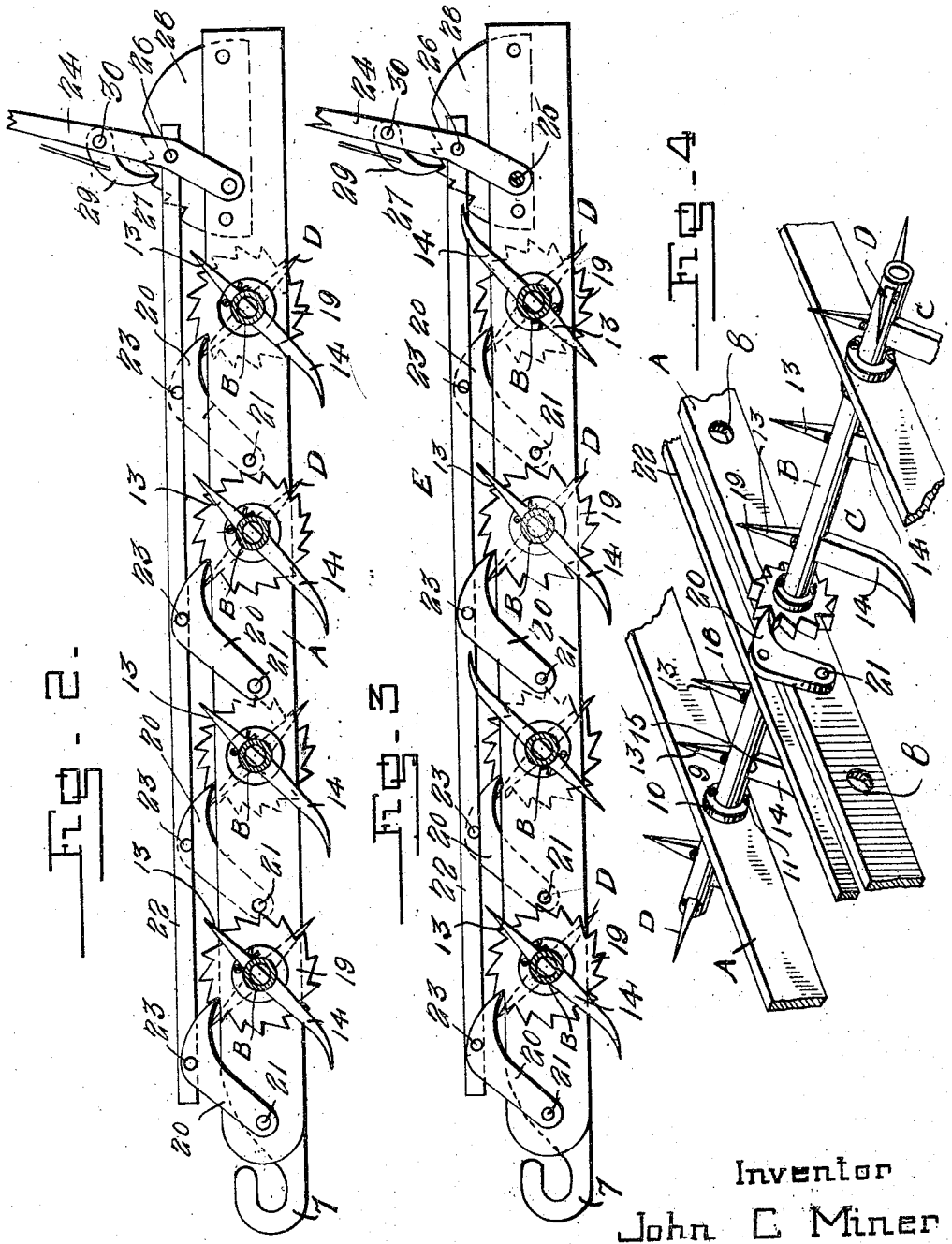

JOHN C. MINER, OF SECURITY, TEXAS.

SELF-CLEANING HARROW AND CULTIVATOR.

1,255,035.      Specification of Letters Patent.      Patented Jan. 29, 1918.

Application filed August 12, 1916. Serial No. 114,545.

*To all whom it may concern:*

Be it known that I, JOHN C. MINER, a citizen of the United States, and a resident of Security, in the county of Montgomery and State of Texas, have invented a certain new and useful Improvement in Self-Cleaning Harrows and Cultivators, of which the following is a specification.

My present invention relates to combined harrows and cultivators, and more particularly to such embodying pig teeth, for harrowing, and shovels for cultivating.

The principal objects of my invention are to provide a machine of the character described which is self-cleaning in that, by manipulation of certain mechanism embodied in the machine, the teeth or shovels are caused to rotate about axes, giving up any stalks, grass, or other fibrous matter which may cling to the teeth or shovels impeding the working of the soil; and, to provide a machine of the character described embodying a plurality of sets of combined harrow teeth and cultivating shovels arranged in succeeding relation and in such a manner that either the harrow teeth or the cultivating shovels may be used to work the soil, or the harrow teeth may be arranged to act upon the soil in advance of the cultivating shovels, the harrow teeth acting somewhat in the manner that a colter facilitates plowing, but cutting the soil in advance of the share.

Other objects of my invention will appear in the following detailed description, taken in connection with the accompanying drawings, forming a part of this specification, and in which drawings:—

Figure 1 is a plan view of a machine embodying my invention.

Fig. 2 is a longitudinal sectional view through the same on the line 2—2 of Fig. 1, and showing the cultivating shovels lowermost.

Fig. 3 is a view similar to Fig. 2, each alternate carrier for the soil working implements having been given a half turn, starting from the front of the machine to dispose harrowing teeth lowermost in advance of cultivating shovels.

Fig. 4 is a perspective view of a portion of the machine to disclose details.

Fig. 5 is a detailed fragmentary view showing an impeller in operation for rotating the carriers of the soil working implements.

Fig. 6 is a perspective view of a combined pig tooth for harrowing and a cultivating shovel.

In the drawings, where similar characters refer to similar parts throughout the several views, A designates beams arranged in spaced-apart parallel relation; B revoluble carriers for soil working implements C; D impellers for rotating carriers B when the implements C do not engage the soil; and E mechanism for retaining the carriers B in a set position with respect to the beams A.

In the example shown, three beams A are provided, preferably made of rolled metal, such as iron, in the form of bars, the outermost beams being provided with hooks 7 facilitating the attachment or hitching of draft animals thereto.

The beams are provided with a plurality of alined transverse bores 8 through which the revoluble carriers B extend, these carriers maintaining the beams A in spaced parallel relation by carrying a plurality of devices 9 one at each side of each beam, where each carrier B extends through its beam, the devices 9 preferably comprising a washer 10 encircling the carrier and a cotter pin 11 extending transversely therethrough, the washer 10 engaging the face of the beam, and the cotter pin 11 being at the opposite face of the washer, as clearly shown in Fig. 4 of the drawings. In order that the machine may not be needlessly weighted, it is preferred to form the carriers B of pipes or hollow cylinders of considerable length.

Referring now to the soil working implements C, one of which is shown in detail in Fig. 6 of the drawings, each comprises a shank 12 polygonal in cross section from one end of which extends the harrowing or pig tooth 13 and from the other end of which extends the cultivating shovel 14. Each carrier B is provided with a plurality of transverse openings 15 corresponding in shape to the shank 12 and receiving the same so as to dispose the harrowing teeth 13 to one side of each carrier, and cultivating shovels 14 at the opposite side thereof, each shovel 14 being provided with a shoulder 16 engaging one side of the carrier, the tooth 13 being provided with a perforation 17 to receive a cotter pin 18 engaging the other face of the carrier.

It is to be observed that, if the beams A are drawn forwardly and the soil working implements C engage the ground, they have a tendency to rotate their carriers until they are in dragging engagement with the soil. As suitable means for impelling the carriers B to rotate under such conditions, the impellers D are provided with their axes in a plane at right angles to the plane of the axes of soil working implements C carried by the carrier, these impellers D being preferably at the end portions of the carriers B and secured in place, in any suitable manner. The impellers may be in the form of two harrow or pig teeth extending at opposite faces of the carrier, as is clearly shown in Fig. 4 of the drawings. Thus, if the beams A are drawn forwardly and there is nothing to restrain rotation of the carriers B, they will constantly rotate as either the soil working implements or impellers engage the ground.

Referring now to the mechanism E which permits independent rotation of any of the carriers B but is adapted to retain all carriers B in a set position with respect to the beams A, it preferably comprises a toothed wheel 19 rigid with each carrier B, said wheels being preferably disposed alternately at opposite sides of the central beam A; dogs 20 pivoted to said beam as at 21, one dog for each wheel 19 adapted to be swung into or out of engagement with the teeth of its respective wheel; a rod 22 pivotally connected with each dog 20 as at 23, adapted to oscillate all of the dogs simultaneously; a lever 24, pivotally carried by the central beam A, as at 25 and pivotally engaging the rod 22 as at 26; and, means 27 for retaining the lever 24 in a set position. The means 27 may comprise a quadrant 28 rigid with the central beam A, a pawl 29 pivotally carried by lever 24 as at 30, an oscillatable handle 31 adjacent the free end of lever 24; and, a rod 32 pivotally connected with the handle 31 and pawl 29 to oscillate the latter as the handle 31 is drawn toward the lever 24 in the well known manner.

The operation of the machine is as follows:—

Assuming that it is desired to use the machine as a cultivator, all of the soil working implements may be arranged with the cultivating shovels lowermost, as shown in Fig. 2 of the drawings, or, they may be arranged with each alternate carrier, starting from the front, having its cultivating shovels lowermost, with the intermediate carriers arranged with harrowing teeth lowermost. As fibrous material is carried forward, during operation of the machine, by the soil working implements, the operator has merely to actuate lever 24 so as to release the dogs 20 from wheels 19, and the carriers will rotate, bringing the fibrous material from the soil working implements. If the cultivating shovels are arranged as in Fig. 3 of the drawings, there will be cultivating shovels in readiness to act upon the soil, as soon as the carriers B have made a half turn after the mechanism E has been operated to release the carriers. Likewise, the carriers may be arranged to dispose the harrowing teeth lowermost or, with harrowing teeth in advance of cultivating shovels, the harrowing teeth breaking up the soil or cutting the same, similar to colters cutting the soil cake in advance of the shares of plows.

The machine may be transported dismembered, and may be easily assembled owing to the arrangement of cylindrical carriers extending through the alined bores 8 of the beams A, with the beams held in spaced parallel relation by the devices 9.

Changes in details may be made without departing from the spirit or scope of my invention; but,

I claim:—

1. A self-cleaning harrow and cultivator comprising in combination, beams, a plurality of revoluble carriers supported thereby, combined harrowing and cultivating teeth on said carriers with the harrowing portions at one side of each carrier, and the cultivating portions at the opposite sides thereof, and means for releasably retaining said carriers individually in adjusted set positions with respect to said beams and capable of releasing all of said carriers simultaneously to permit them to rotate in unison.

2. A self-cleaning harrow and cultivator comprising in combination, beams, a plurality of revoluble carriers supported thereby, combined harrowing and cultivating teeth on said carriers, means for releasably retaining said carriers individually in adjusted set positions with respect to said beams and capable of releasing all of said carriers simultaneously to permit them to rotate in unison, and means operable by forward movement of said beams for impelling said carriers to rotate when the latter are free from said last mentioned means, and when the said teeth do not engage the soil.

3. A self-cleaning harrow and cultivator comprising in combination, beams, a plurality of revoluble carriers supported thereby, combined harrowing and cultivating teeth on said carriers with the harrowing portions at one side of each carrier, and the cultivating portions at the opposite sides thereof, means for releasably retaining said carriers individually in adjusted set positions with respect to said beams and capable of releasing all of said carriers simultaneously to permit them to rotate in unison, and means operable by forward movement of said beams for impelling said carriers to rotate when the latter are free from said last mentioned means, and when the said teeth do not engage the soil.

4. A self-cleaning harrow and cultivator comprising in combination, beams, revoluble carriers supported thereby, crosswise of said beams and in succeeding relation from the rear to the front of the machine, combined harrow and cultivating teeth on said carriers with the harrowing portions at one side of each carrier, and the cultivating portions at the opposite side thereof, and means permitting independent rotation of any of said carriers so as to arrange either the harrowing or cultivating portions of said teeth lowermost, or harrowing portions of the teeth of a forward carrier in advance of cultivating portions of the teeth of a succeeding carrier, said means capable of restraining all of said carriers against rotation.

5. A self-cleaning harrow and cultivator comprising in combination, beams, revoluble carriers supported thereby, crosswise of said beams and in succeeding relation from the rear to the front of the machine, combined harrow and cultivating teeth on said carriers with the harrowing portions at one side of each carrier, and the cultivating portions at the opposite side thereof, means permitting independent rotation of any of said carriers so as to arrange either the harrowing or cultivating portions of said teeth lowermost, or harrowing portions of the teeth of a forward carrier in advance of cultivating portions of the teeth of a succeeding carrier, said means capable of restraining all of said carriers against rotation, and means operable by forward movement of said means for impelling said carriers to rotate when the latter are free from said first mentioned means, and when the said teeth do not engage the soil.

6. In a machine of the character described, the combination of a plurality of beams arranged in parallelism and provided with alined transverse bores, cylindrical carriers extending through said bores and revoluble therein, detachable devices at each side of each beam, on each carrier, maintaining said beams in parallel spaced relation, soil working teeth carried by said carriers, and means for retaining said carriers in an adjusted set position with respect to said beams.

JOHN C. MINER.

Copies of this patent may be obtained for five cents each, by addressing the "Commissioner of Patents, Washington, D. C."